(12) United States Patent
Schulte et al.

(10) Patent No.: US 6,437,739 B1
(45) Date of Patent: Aug. 20, 2002

(54) METHODS AND SYSTEMS FOR MONITORING MULTIPLE CHANNELS IN A VERY HIGH FREQUENCY OMNI-DIRECTIONAL RANGE RECEIVER

(75) Inventors: Christopher E. P. Schulte, Independence; John M. Foley, Salem, both of OR (US)

(73) Assignee: United Parcel Service of America, Inc., Atlanta, GA (US)

( * ) Notice: Subject to any disclaimer, the term of this patent is extended or adjusted under 35 U.S.C. 154(b) by 0 days.

(21) Appl. No.: 09/736,473

(22) Filed: Dec. 13, 2000

Related U.S. Application Data (60) Provisional application No. 60/170,881, filed on Dec. 15, 1999.

(51) Int. Cl.$^7$ .................................................. G01S 1/44
(52) U.S. Cl. ...................................................... 342/401
(58) Field of Search ................................. 342/401, 404, 342/450, 452, 457

(56) References Cited

U.S. PATENT DOCUMENTS

| | | | |
|---|---|---|---|
| 4,184,158 A | | 1/1980 | Smith, II |
| 4,212,067 A | * | 7/1980 | Henderson ................... 701/300 |
| 4,499,586 A | | 2/1985 | Cafarella et al. |
| 4,701,934 A | * | 10/1987 | Jasper .......................... 375/147 |
| 4,714,929 A | | 12/1987 | Davidson |

* cited by examiner

Primary Examiner—Thomas H. Tarcza
Assistant Examiner—Fred H. Mull
(74) Attorney, Agent, or Firm—Alston & Bird LLP (57) ABSTRACT

The present invention relates to methods and systems for time-multiplexing a single VOR receiver to determine bearings from two or more VOR stations and thus determine a relative position of an object such as an aircraft. The invention employs a software-programmable digital signal processor (DSP) to process the VOR signals and control the amplifier stage. The gain control parameters that are used to process the VOR signals are stored for each processed carrier frequency so that the VOR signals may be quickly and reliably acquired; thus, enabling the time-multiplexing of the VOR receiver.

33 Claims, 4 Drawing Sheets

METHODS AND SYSTEMS FOR MONITORING MULTIPLE CHANNELS IN A VERY HIGH FREQUENCY OMNI-DIRECTIONAL RANGE RECEIVER

CROSS-REFERENCE TO RELATED APPLICATIONS

This application claims priority to Provisional Application Serial No. 60/170,881, filed on Dec. 15, 1999.

FIELD OF THE INVENTION

The invention relates generally to a method and system for time-multiplexing a single VOR (VHF Omni-directional Range) receiver, and more specifically to time-multiplexing a single VOR receiver to determine bearings from two or more VOR stations.

BACKGROUND OF THE INVENTION

Very high frequency omni-directional range (VOR) radio navigation has existed since the 1940s. The basic function of a VOR navigation system is to provide an aircraft with a means for determining direction by referencing a ground-based VOR transmitter station or for determining relative position by referencing multiple VOR stations.

A VOR transmitter modulates two reference signals onto a particular carrier frequency assigned to that VOR station (VOR carrier frequencies exist between 108.00 MHz and 117.95 MHz). The first reference signal is a pure 30 Hz AM tone and the second reference signal is a 30 Hz tone that is FM modulated at 9,960 Hz with a deviation ratio of 16. One of these signals is transmitted so that its phase is constant when measured in any direction from the VOR station. The other signal will show a relative phase shift between 0 and 360 degrees depending upon the bearing of the aircraft from the VOR station. The variable phase signal is aligned so that there is no phase shift when measured from a bearing of magnetic north from the ground station where the VOR transmitter is located. Depending upon the transmitter design, either 30 Hz signal may be used as the variable phase signal. The VOR receiver carried by an aircraft determines the phase differential between these two signals and thus with reference to magnetic north provides the pilot with an indication of his current bearing from the VOR station. For instance, if the phase differential is 128 degrees, then the aircraft is at a bearing of 128 degrees from that VOR station.

Taken together, these VOR stations are the basis for an extensive network of airways used by air traffic for en-route navigation. Aircraft fly along paths defined by radials from VOR stations and use onboard VOR receivers to track the radials defining the airways. Typically, aircraft will carry two VOR receivers which, of course increases the cost, weight, and size of these types of VOR navigation systems. One VOR receiver is used to track the current course to or from a VOR station, while the second VOR receiver can be used to determine the aircraft's bearing from other VOR stations. These additional bearings from the other VOR stations can then be used to determine a two-dimensional relative position fix for the aircraft at the point where the bearings intersect.

Current VOR navigation systems that use one VOR receiver do not receive, process, or display more than one VOR signal at any given time. In order to receive both a primary VOR signal to follow or a localizer signal when near a runway, and a standby VOR signal for intersection calculations, a user of currently existing single receiver VOR navigation systems must constantly, manually swap back and forth between two or more VOR stations transmitting on different carrier frequencies and wait for signal acquisition.

This delay in honing in on the carrier frequency is because of the need to keep the received signal at a stable level; all radio receivers have some kind of automatic gain control (AGC) to stabilize the signal level. Traditional VOR receivers use a relatively slow integrator loop to control the gain stages of the amplifier. A slow AGC is necessary so the 30 Hz tone signals will not be washed out. Again, the phases of the 30 Hz signals must be compared in order to compute their phase differential and thus the bearing radial. The slow integrator loop makes it impossible to rapidly tune the receiver to multiple VOR stations on different frequencies that may have drastically different signal levels.

There is a need for a single receiver VOR navigation system that can receive and display multiple VOR signals and a localizer signal without user intervention. Thus, there is also a need for an automatic gain control to maintain acceptable signal strengths and operate quickly and accurately.

SUMMARY OF THE INVENTION

The present invention provides a single receiver VOR navigation system that can receive and display multiple VOR signals without user intervention by using a digital signal processor (DSP) to perform quick and accurate automatic gain control by controlling the amplifier stages to maintain an acceptable signal strength.

Each neighboring VOR station transmits on different carrier frequencies. The amplification of the 30 Hz signals used to determine bearing are based on the strength of the carrier frequency. The present invention allows for the multiplexing of a single VOR receiver to receive additional VOR stations' carrier frequencies. The multiplexing is facilitated by first using stored AGC parameter settings for each frequency to quickly set the amplifier stage for another VOR station that has different path characteristics. To allow for the selection of multiple carrier frequencies a digital synthesizer is used to tune an oscillator. This type of digital tuner can be adjusted in precise sequence with the digital signal processing of the automatic gain control to develop a VOR multiplexing system or VOR Monitor. A localizer signal which is in the same band as the VOR signals may also be multiplexed by the system if selected by the user.

By using a combination of hardware and software, the DSP can control and adjust the amplifier gain stages and thus the total signal amplification may be changed from a minimum level to a maximum level (or anywhere in between) in an extremely short period of time. Additionally, the DSP software can save the amplifier settings used for a particular VOR frequency or localizer frequency to be used as a close starting point when the frequency is shortly re-selected.

According to one embodiment of the present invention, there is disclosed a method for determining a relative position of an object using multiple frequencies received from multiple transmitter locations which includes receiving a first frequency transmitted from a first known transmitter location using a receiver, determining a first radial bearing for the object relative to the first known transmitter location from the first frequency, receiving a second frequency transmitted from a second known transmitter location wherein the second frequency is received using the receiver used to receive the first frequency and without requiring a user to manually change a setting of the receiver to receive the second frequency, determining a second radial bearing for the object relative to the second known transmitter location from the second frequency, and using the first radial bearing and second radial bearing to determine the relative position of the object.

According to another embodiment of the present invention, there is disclosed a method for determining relative position of an object using multiple frequencies received from multiple transmitter locations using a receiver which includes selecting a first frequency transmitted from a first known transmitter location, retrieving automatic gain control parameters associated with the first frequency, receiving the first frequency using the automatic gain control parameters associated with the first frequency, determining a first radial bearing for the object relative to the first known transmitter location from the first frequency, selecting a second frequency transmitted from a second known transmitter location, retrieving automatic gain control parameters associated with the second frequency, receiving the second frequency using the automatic gain control parameters associated with the second frequency wherein the second frequency is received using the receiver used to receive the first frequency and without requiring a user to manually change a setting of the receiver to receive the second frequency, determining a second radial bearing for the object relative to the second known transmitter location from the second frequency, and using the first radial bearing and second radial bearing to determine the relative position of the object.

According to another embodiment of the present invention, there is disclosed a system for determining relative bearings of an object using multiple frequencies received from multiple transmitter locations which includes a receiver capable of receiving a plurality of frequencies and demodulating a plurality of signals, an amplifier stage, operative to adjust a signal strength of the plurality of signals in accordance with at least one automatic gain control parameter associated with each of the plurality of frequencies, an analog/digital converter, operative to convert the plurality of signals from a plurality of analog waveforms to a plurality of digital waveforms, one or more processors, operative to individually average the signal strength of each of the plurality of digital waveforms, to adjust the at least one automatic gain control parameter associated with each of the plurality of frequencies, to receive when an alternate frequency should be monitored and coupled to the receiver to adjust the receiver to receive another of the plurality of frequencies, one or more memory devices coupled to one or more processors and operative to store the at least one automatic gain control parameter associated with the plurality of frequencies and to, and store instructions for one or more processors.

According to another embodiment of the present invention, there is disclosed a system for processing multiple frequencies received from multiple transmitter locations which includes a receiver capable of receiving a plurality of frequencies and demodulating a plurality of signals, an amplifier stage, operative to adjust a signal strength of the plurality of signals in accordance with at least one automatic gain control parameter associated with each of the plurality of frequencies, an analog/digital converter, operative to convert the plurality of signals from a plurality of analog waveforms to a plurality of digital waveforms, one or more processors, operative to individually average the signal strength of each of the plurality of digital waveforms, to adjust the at least one automatic gain control parameter associated with each of the plurality of frequencies, and coupled to the receiver to adjust the receiver to receive another of the plurality of frequencies, and one or more memory devices coupled to the digital signal processor and operative to store the at least one automatic gain control parameter associated with the plurality of frequencies.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

In a preferred embodiment of a navigation system in accordance with the present invention, a user first enters a frequency that corresponds to the VOR station that the user wants to use to drive the indicator head to show the direction of desired motion; this frequency is denoted as the active frequency and may be refreshed at an acceptable rate to ensure proper course heading—one embodiment refreshes at a rate of 5 Hz. The user then may enter one or more frequencies corresponding to different VOR stations that may be used to determine the user's position; these additional frequencies are denoted as standby frequencies. The user then may instruct the system to monitor the standby frequencies so as to receive, process, and display the bearing information garnered from these standby frequencies. The system monitors the frequencies by time multiplexing the system resources.

The following sequence of events typically occurs each time one of the multiplexed carrier frequencies is processed. The VOR navigation system halts any ongoing processing of a previous frequency and saves any processed data and amplifier settings in a memory storage. Following the saving of processed data, the VOR receiver is tuned to the carrier frequency corresponding to the new VOR station. Saved AGC data for this VOR frequency is loaded from the memory device, and the amplifier stages are calibrated using the stored AGC settings. If the frequency has not been tuned before, default settings may be used for the amplifier stages. Finally, the VOR navigation system processes the frequency for a fixed period of time. If the frequency being monitored has never been processed before, then the time period is increased in order allow the amplifier stage to hone in on acceptable amplifier settings. Once the allocated time expires, the VOR navigation system repeats the above cycle with a new VOR signal from a different station.

The present invention may be embodied as a time-multiplexed VOR receiver that is able to allocate time between multiple VOR stations transmitting on different carrier frequencies. Each carrier frequency may be processed in a round-robin fashion for a predetermined period of time. That is, a system embodying the present invention receives a first VOR frequency for a fixed time interval and displays a bearing readout, and receives a second VOR station for another fixed time interval and also displays the bearing results from that station. Of course, more than two VOR stations may be processed and the bearing results displayed. The number of VOR stations that may be processed in a given period of time is limited by desired refresh rates and the processing power of the system.

Typically, VOR receivers drive an external indicator head, which must be updated at a regular periodic rate. An external indicator head displays the desired/selected course of the aircraft that should remain constant for the aircraft and shows a deviation (if any) for the aircraft relative to the selected course. This carrier frequency that drives the head is designated as the active frequency and may be a VOR signal or a localizer—localizers are frequencies specific to individual runways that may be selected as the active frequency to display whether the aircraft is left or right of the center of the runway so that a pilot may make the proper course correction when near an airport. The active frequency is typically allocated more processing time than other frequencies to ensure that a sufficient update rate is met. The other multiplexed frequencies from other VOR stations that simply are used to determine bearing intersections may share the remainder of the time equally or in some varied proportion of time depending upon the particular system embodiment.

The number of carrier frequencies, representing the number of VOR stations, that may be multiplexed is only limited by the required update rate and the desired accuracy of the computed radials. Generally, the accuracy of a decoded radial increases with the length of time that the received VOR signal is processed; a compromise must be made between these two factors. If the user has entered multiple standby frequencies to monitor, then according to one embodiment of the present invention, the active frequency would be processed for 100 msec and the display updated and then a second frequency (the first standby frequency) would be processed for 100 msec and the display updated. Next, the active frequency would be processed for 100 msec and the display updated and then a third frequency (the second standby frequency) would be processed for 100 msec and the display updated. This process continues until the last standby frequency is processed and then loops back to the beginning.

In one embodiment, the active frequency is updated at a 10 Hz rate for 800 msec and 200 msec is then allocated to the second frequency (the standby frequency) which is updated once per second. Note, however, when the standby frequency is initially entered by the user and first processed, 500 msec is allocated to the standby frequency to hasten the search for the proper AGC settings.

Figure 1:
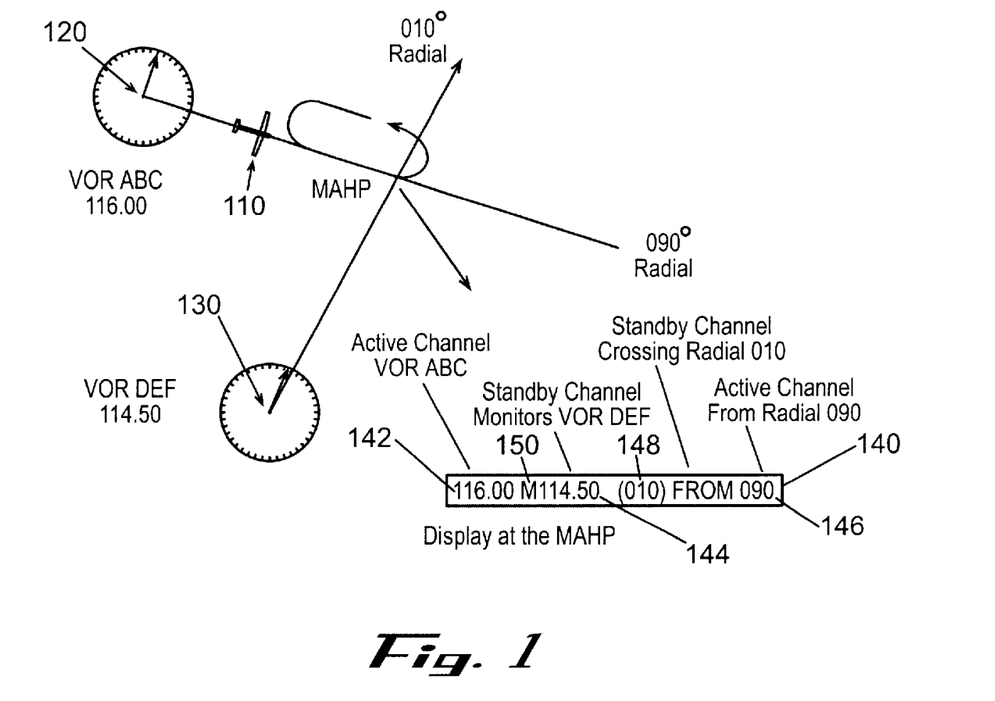
FIG. 1 is a diagram illustrating the general operation of the VOR single receiver navigation system that determines the relative position of an aircraft in accordance with an embodiment of the present invention.

Referring now to FIG. 1, in accordance with an embodiment of the present invention, a diagram is shown illustrating the general background of how a VOR receiver on board an aircraft operates to determine the relative position of an aircraft 110. The pilot of the aircraft 110 has selected the VOR station 120 transmitting on carrier frequency 116.00 MHz as the active frequency. In addition, the aircraft 110 is travelling along a 90 degree radial from the VOR station 120. To determine the aircraft's 110 relative position along the 90 degree radial, the pilot has selected a second VOR station 130 transmitting on a carrier frequency of 114.50 MHz as a standby frequency. The VOR receiver on the aircraft 110 is allocated a portion of time to receive the frequency from the second VOR station 130 and process the phase differential signals to determine the bearing of the aircraft 110 from this second VOR station 130. Note that the time allocated to the standby frequency is limited so that the active frequency from the first VOR station 120 may be periodically received and processed so that the indicator head may be refreshed thus ensuring the aircraft 110 stays on course along the 90 degree radial.

FIG. 1 also provides an exemplary display 140 of when an aircraft 110 is at a particular relative position that could be used by a pilot, using the VOR navigation system, to read the aircraft's 110 bearings from the VOR stations 120, 130. The display shows the active carrier frequency 142, the standby carrier frequency 144, the bearing 146 from the active VOR station 120, and the bearing 148 from the standby VOR station 130. This display also shows a "m" 150 to denote that the standby carrier frequency will be monitored (i.e. periodically refreshed through multiplexed use of the single VOR receiver). The pilot can quickly determine his relative position from the bearings 146, 148 because his aircraft 110 is where the bearings cross (i.e. in this example where the line extending 90 degrees from magnetic north starting at the first VOR station 120 intersects the line extending from 10 degrees from magnetic north starting from the second VOR station 130).

Figure 2:
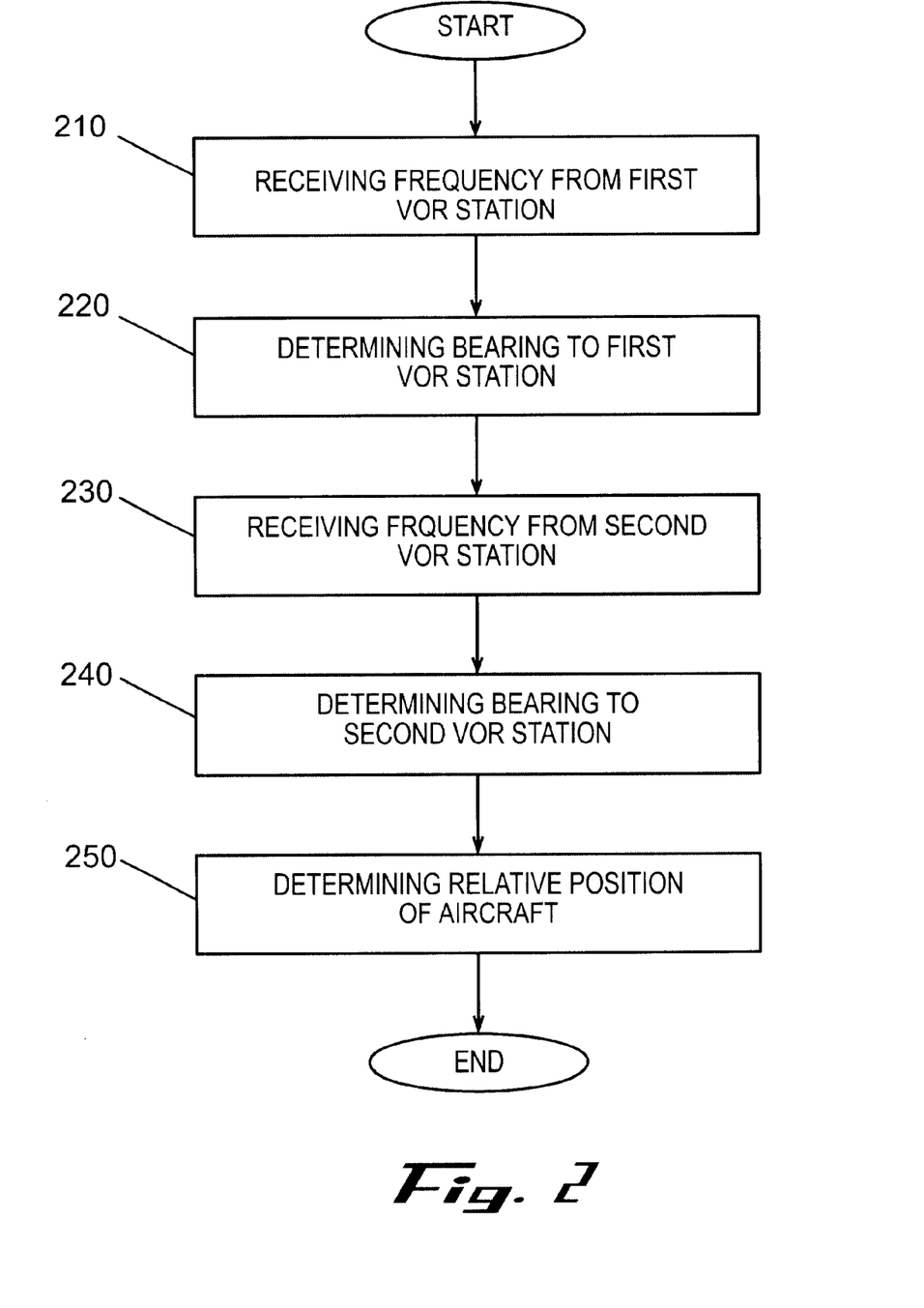
FIG. 2 is a flowchart illustrating the operation of a VOR receiver in accordance with an embodiment of the present invention.

Referring now to FIG. 2, a flowchart illustrating the operation of a VOR single receiver navigation system in accordance with an embodiment of the present invention is illustrated. The first step for determining a relative position of an aircraft using multiple carrier frequencies received from multiple transmitter locations is to receive a first carrier frequency transmitted from a first known VOR station as illustrated in Block 210. In other embodiments, the first frequency is transmitted from a localizer station that is associated with a particular runway. Next, the bearing for the aircraft from the first VOR station is determined as illustrated in Block 220. Then, using the same receiver and time multiplexing a second frequency transmitted from a second VOR station is received as illustrated in Block 230. Note that this second carrier frequency (herein denoted a standby frequency) does not need to be continually selected by the pilot. Once the pilot inputs the carrier frequency or some other designator of the second VOR station, the VOR navigation system, in accordance with the present invention, periodically switches to this standby frequency to refresh the bearing reading without the pilot's interaction. Then, the next step is to determine the bearing of the aircraft from this second VOR station as illustrated by Block 240. Finally, the relative position of the aircraft is determined as shown in Block 250.

In one embodiment of the present invention, the carrier frequency is only received from the first VOR station for a set period of time and the carrier frequency of the second VOR station is received for the remaining portion of time out of a total amount of time. In one embodiment of the present invention, the relative position of the aircraft is determined by comparing the first radial bearing to the coordinates from the first VOR station and the second radial bearing to the coordinates of the second VOR station to automatically determine a set of coordinates, such as latitude and longitude, to indicate the current position of the aircraft. In another embodiment of the current invention, the relative position of the aircraft is determined by displaying the first radial bearing and the second radial bearing to the pilot and allowing the pilot to calculate a current position by extending the bearings until they intersect.

In an embodiment of the present invention, the first frequency that is selected by the user to be the active frequency is a localizer signal. Localizer frequencies are associated with individual runways and modulated so that the navigation system can determine and display if the aircraft is left of the centerline of the runway or right of the centerline of the runway. Specifically, if one of two tones embedded in the localizer signal (which have antennae arrays slightly off center of the runways) is stronger than the other, then the system knows it is closer to the stronger tone and may advise accordingly. The pilot is provided with a display such as a needle that is skewed to the left or the right if the aircraft is off the centerline so that the pilot may make the appropriate correction to center the needle.

Localizer signals are followed by aircraft during their approach to guide the aircraft along a set flight path. Localizer signals do not provide information that allows a radial bearing to be determined; rather these signals just indicate whether the aircraft is left or right of the runway's centerline. However, a pilot that has selected a localizer as the active frequency when approaching a runway may still select VOR stations to monitor so that the aircraft's position may be fixed. The aircraft's position may be fixed using the localizer signal and a single VOR station. The radial bearing of the standby VOR station is determined as before by comparing the phase differential of the tones in the VOR signal. The other bearing reference for the aircraft is determined by referencing the published bearing for the runway that the pilot has selected by selecting the associated localizer signal. Having the radial bearing from the runway and from the VOR station allows the pilot to determine where the bearings intersect to fix the aircraft's position. Of course, this method assumes that the pilot is maintaining the proper course for the selected runway (centering the needle).

Figure 3:
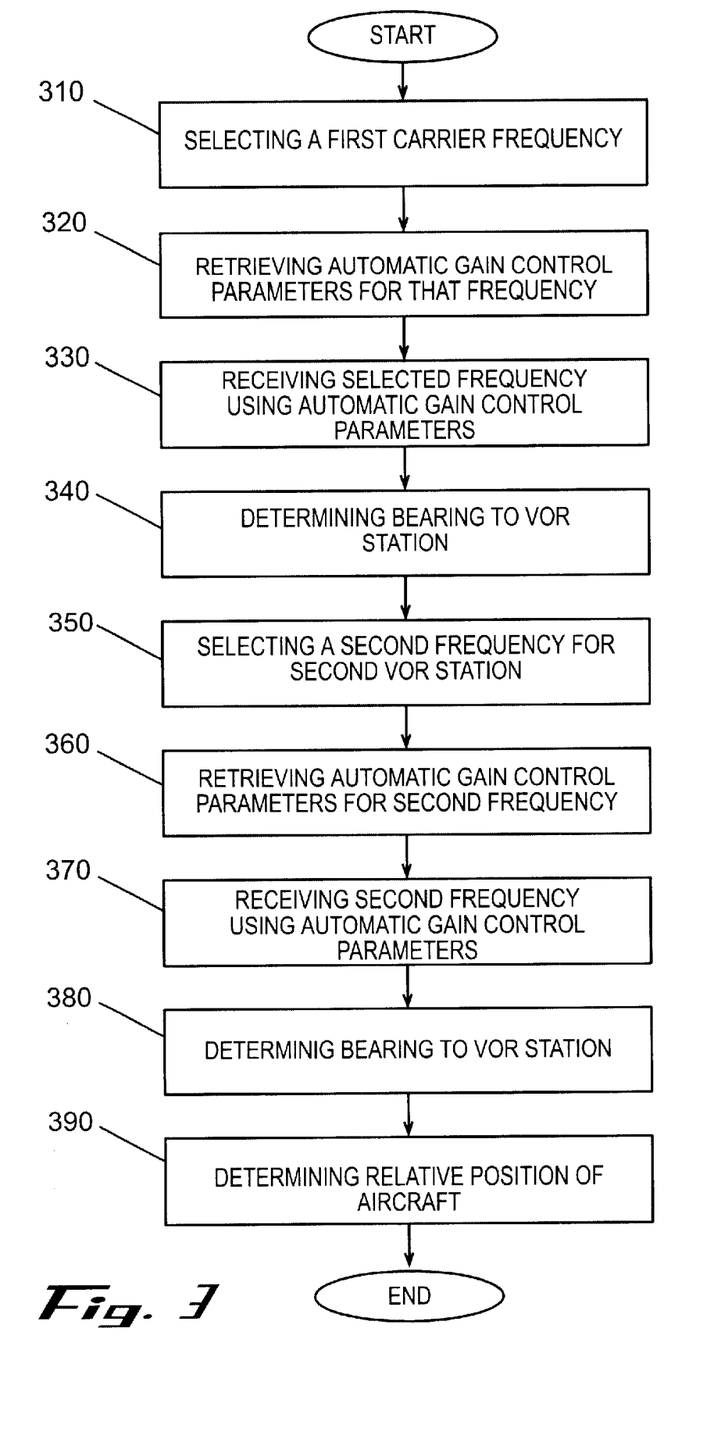
FIG. 3 is a flowchart illustrating the operation of a VOR receiver in accordance with another embodiment of the present invention.

Referring now to FIG. 3, a flowchart illustrating the operation of a VOR single receiver navigation system in accordance with another embodiment of the present invention is illustrated. In accordance with this preferred embodiment, the first step for determining the relative position of an aircraft using multiple carrier frequencies from multiple VOR stations is to select a first carrier frequency from the pool of frequencies previously inputted by the pilot as illustrated in Block 310. The next step is to retrieve the automatic gain control parameters associated with the carrier frequency for that VOR station as illustrated in Block 320. If this particular carrier frequency has not been recently received, then default beginning values may be used for the automatic gain control parameters to be passed to the amplifier stage of the VOR navigation system. The next step is to receive this selected carrier frequency from this VOR station using the automatic gain control parameters associated with the this carrier frequency as illustrated in Block 330. Then the radial bearing for the aircraft relative to the VOR station is determined as illustrated in Block 340.

The next step is to select a second carrier frequency transmitted from a second VOR station as illustrated in Block 350. Then the automatic gain control parameters associated with this carrier frequency for this VOR station are retrieved as illustrated in Block 360. Then, this selected carrier frequency is received from this VOR station using the automatic gain control parameters associated with this carrier frequency as illustrated in Block 370. As before, the pilot does not need to manually change the frequency selector on the VOR system and wait while the system acquires the new frequency. In traditional VOR navigation systems, this delay would be unacceptably long and not allow for sufficient refreshing of the indicator head. Next, the radial bearing for the aircraft relative to the second VOR station is determined as illustrated in Block 380. Finally, the relative position of the aircraft is determined as shown in Block 390. Note again that multiple standby frequencies may be selected by the user for monitoring in which case the system allocates the time devoted to monitoring the standby frequencies amongst the selected standby frequencies.

Additional steps that may be included in accordance with another embodiment of the present invention include storing the automatic gain control parameters associated with a carrier frequency before transitioning to receiving another carrier frequency. In this embodiment of the present invention, the carrier frequency is only received from the first VOR station for a set period of time and the carrier frequency of the second VOR station is received for the remaining portion of time out of a total amount of time. The amount of time that each signal may be received and processed is dictated by a variety of factors including the refresh requirements associated with the active frequency to ensure that the aircraft remains on course. As before, the relative position of the aircraft may be determined automatically with reference to the coordinates of the received VOR stations or may be determined by the pilot by determining the intersection of the radial bearings from the VOR stations.

Figure 4:
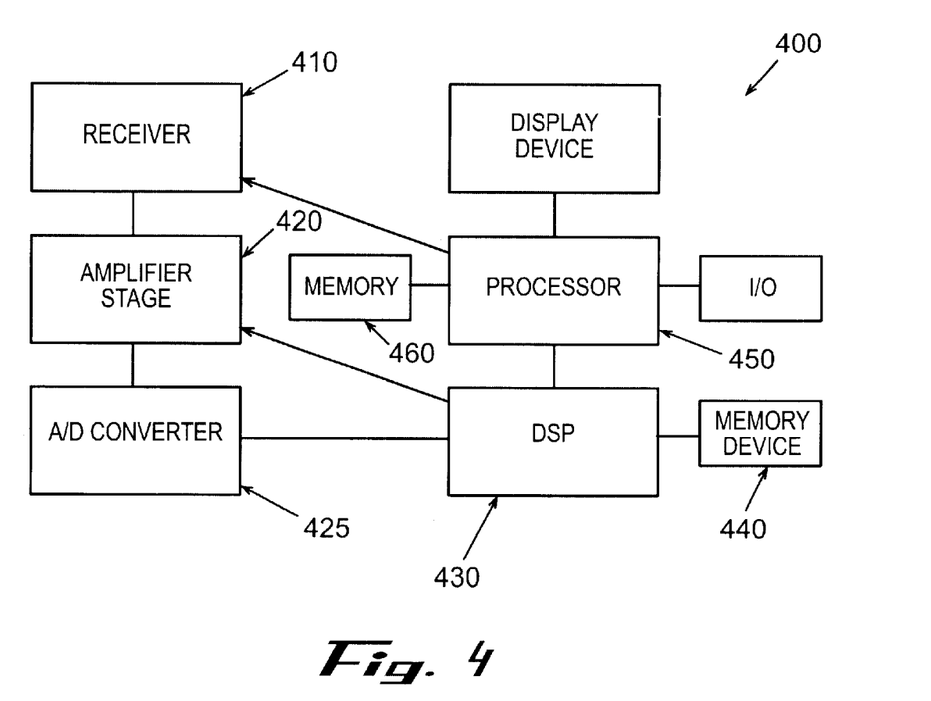
FIG. 4 illustrates a functional block diagram of single receiver VOR navigation system in accordance with an embodiment of the present invention.

Referring now to FIG. 4, a functional block diagram of a single receiver VOR navigation system 400 in accordance with an embodiment of the present invention is illustrated. The VOR navigation system includes a receiver 410, an amplifier stage 420, an analog/digital (A/D) converter 425, a digital signal processor (DSP) 430, a memory device 440, a processor 450, and processor memory 460. The receiver 410 receives the carrier frequencies from the VOR or localizer stations, demodulates the VOR phase differential signals, and is communicatively coupled to the amplifier stage 420. The amplifier stage 420 varies the gain control parameters to compensate for varying path characteristics and losses that the signals experience. The amplifier stage 420 is communicatively connected to the A/D converter 425, which quantitizes the received waveforms (one embodiment takes 32,000 samples per second) so that the waveforms may be processed by the DSP 430. The DSP 430 is communicatively connected to the A/D converter 425 and amplifier stage 420 so that the DSP 430 may adjust the AGC based on the amplitude of the processed signal. The DSP 430 also is communicatively connected to the memory device 440 for storing and retrieving gain control parameters stored by channel and decoding the phase of the 30 Hz and 9960 Hz subcarrier and the DSP 430 passes the appropriate parameters to the amplifier stage 420. The DSP 430 is also connected to the processor 450 for communicating the decoded radials and when to monitor the alternate frequencies. The processor is also communicatively connected to the receiver 410 to switch the receiver to different carrier frequencies. The processor memory 460 is connected to the processor 450 and is used in execution of the user interface. The processor 450 tunes the receiver 410 and drives the display and external input/output (indicator head).

In a preferred embodiment of the VOR navigation system 400, the DSP 430 estimates the strength of a VOR phase signal by averaging the signal strength over a given period and comparing that average to a desired signal level. In the preferred embodiment, the desired signal level optimally falls between 0 and 2.5 volts. The difference between the average signal strength computed by the DSP 430 and the desired level is addressed by adjusting the stages of the amplifier 420.

Generally only small gain adjustments are made and this process is performed in conjunction with the filtering and processing of the VOR signal. If, however, the estimate of the signal level indicates that large gain adjustments are required, additional processing is halted while the DSP 430 attempts to rapidly lock in on the signal. If the signal strength of the VOR signal is too weak to process that signal, then processing of that VOR signal is halted. After the gross gain adjustments are made, the DSP 430 then measures the average signal strength of the VOR signal, as described above, and adjusts the amplifier stages 420 so that the VOR signal approaches the desired signal level. These rapid adjustments will continue until the sampled signal is close to the desired level, at which point the other filtering and processing continues.

When the VOR signal is properly adjusted, the parameters used to modulate the VOR signal strength are saved to the memory device 440 as updated gain control parameters associated with the particular channel (a channel is just the carrier frequency—either the active or standby frequency in this embodiment). Thus, whenever the processor 450 tunes the particular channel, the DSP 430 and signal amplifier 420 may employ updated gain control parameters for signal modulation, rather than relying on default parameters. This permits more rapid adjustment of VOR signal by the VOR navigation system 400. In this manner, subsequent processing of the same channel may be more rapidly adapted to optimal levels through the use of the stored gain control parameters.

In other embodiments of the present invention, a single processor may be used instead of a separate DSP 430 and processor 450 to perform the same functionality as the DSP 430 and processor 450. Likewise, a single memory device may be used to perform the functions of a separate memory device 440 and processor memory 460.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for determining a relative position of an object using multiple frequencies received from multiple transmitter locations, comprising:

initially receiving a first frequency transmitted from a first known transmitter location using a receiver and automatic gain control parameters associated with the first frequency, wherein said automatic gain control parameters are configured to selectively strengthen a signal received over said first frequency;

determining a first radial bearing for the object relative to the first known transmitter location from the first frequency;

receiving a second frequency transmitted from a second known transmitter location wherein the second frequency is received using the receiver used to receive the first frequency and without requiring a user to manually change a setting of the receiver to receive the second frequency; and determining a second radial bearing for the object relative to the second known transmitter location from the second frequency.

2. The method of claim 1 further comprising the steps of receiving additional frequencies transmitted from additional known transmitter locations wherein the additional frequencies are received using the receiver used to receive the first frequency and without requiring a user to manually change a setting of the receiver to receive the additional frequencies and determining additional radial bearings for the object relative to the additional known transmitter locations from the additional frequencies.

3. The method of claim 1 wherein the step of receiving the first frequency comprises receiving the first frequency for a first amount of time of a total amount of time and wherein the step of receiving the second frequency comprises receiving the second frequency for the remaining amount of time of the total amount of time.

4. The method of claim 1, further comprising using the first radial bearing and second radial bearing to determine the relative position of the object, by comparing the first radial bearing to the first transmitter location and the second radial bearing to the second transmitter location to determine a set of coordinates indicating a current position.

5. The method of claim 1, wherein the first frequency and second frequency comprise very high frequency omnidirectional frequencies.

6. The method of claim 1 wherein the object is an airplane.

7. The method of claim 1, further comprising using the first radial bearing and second radial bearing to determine the relative position of the object by displaying the first radial bearing and the second radial bearing to the user and allowing the user to calculate a current position.

8. The method of claim 7, wherein allowing the user to calculate a current position comprises having the user calculate the current position of the object by determining the intersection of the first radial bearing and the second radial bearing.

9. The method of claim 1, wherein the first frequency comprises a localizer signal.

10. The method of claim 9, wherein determining a first radial bearing for the object comprises determining a listed bearing that is associated with a runway that is associated with the first frequency.

11. A method for determining relative position of an object using multiple frequencies received from multiple transmitter locations using a receiver, comprising:

selecting a first frequency transmitted from a first known transmitter location;

retrieving automatic gain control parameters associated with the first frequency;

initially receiving the first frequency using the automatic gain control parameters associated with the first frequency, wherein said automatic gain control parameters are configured to selectively strengthen a signal received over said first frequency;

determining a first radial bearing for the object relative to the first known transmitter location from the first frequency;

selecting a second frequency transmitted from a second known transmitter location;

retrieving automatic gain control parameters associated with the second frequency;

receiving the second frequency using the automatic gain control parameters associated with the second frequency wherein the second frequency is received using the receiver used to receive the first frequency and without requiring a user to manually change a setting of the receiver to receive the second frequency;

determining a second radial bearing for the object relative to the second known transmitter location from the second frequency; and using the first radial bearing and second radial bearing to determine the relative position of the object.

12. The method of claim 11, further comprising the steps of:

storing automatic gain control parameters associated with the first frequency and storing automatic gain control parameters associated with the second frequency.

13. The method of claim 11 wherein the step of receiving the first frequency comprises receiving the first frequency for a first amount of time of a total amount of time and wherein the step of receiving the second frequency comprises receiving the second frequency for the remaining amount of time of the total amount of time.

14. The method of claim 11, wherein the step of using the first radial bearing and second radial bearing to determine the relative position of the object comprises, comparing the first radial bearing to the first transmitter location and the second radial bearing to the second transmitter location to determine a set of coordinates indicating a current position.

15. The method of claim 11, wherein the first frequency and second frequency comprise very high frequency omni-directional frequencies.

16. The method of claim 11 wherein the object is an airplane.

17. The method of claim 11, wherein the step of using the first radial bearing and second radial bearing to determine the relative position of the object comprises, displaying the first radial bearing and the second radial bearing to the user and allowing the user to calculate a current position.

18. The method of claim 17, wherein allowing the user to calculate a current position comprises having the user calculate the current position of the object by determining the intersection of the first radial bearing and the second radial bearing.

19. The method of claim 11, wherein the first frequency comprises a localizer signal.

20. The method of claim 19, wherein determining a first radial bearing for the object comprises determining a listed bearing that is associated with a runway that is associated with the first frequency.

21. An apparatus for processing multiple frequencies received from multiple transmitter locations, comprising:

a receiver capable of receiving a plurality of frequencies and demodulating a plurality of signals;

an amplifier stage, operative to adjust a signal strength of the plurality of signals in accordance with at least one automatic gain control parameter associated with each of the plurality of frequencies;

an analog/digital converter, operative to convert the plurality of signals from a plurality of analog waveforms to a plurality of digital waveforms;

one or more processors, operative to individually average the signal strength of each of the plurality of digital waveforms, to adjust the at least one automatic gain control parameter associated with each of the plurality of frequencies, and coupled to the receiver to initially adjust the receiver to receive another of the plurality of frequencies; and one or more memory devices coupled to the digital signal processor and operative to store the at least one automatic gain control parameter associated with the plurality of frequencies.

22. An apparatus for determining at least one relative bearing of an object using multiple frequencies received from multiple transmitter locations, comprising:

a receiver capable of receiving a plurality of frequencies and demodulating a plurality of signals;

an amplifier stage, operative to adjust a signal strength of the plurality of signals in accordance with at least one automatic gain control parameter associated with each of the plurality of frequencies;

an analog/digital converter, operative to convert the plurality of signals from a plurality of analog waveforms to a plurality of digital waveforms;

one or more processors, operative to individually average the signal strength of each of the plurality of digital waveforms, to initially adjust the at least one automatic gain control parameter associated with each of the plurality of frequencies, to determine at least one relative bearing of the object and coupled to the receiver to adjust the receiver to receive another of the plurality of frequencies; and one or more memory devices coupled to the digital signal processor and operative to store the at least one automatic gain control parameter associated with the plurality of frequencies.

23. The apparatus of claim 22, further comprising a display device.

24. The apparatus of claim 22, further comprising an input device for inputting each of the plurality of frequencies.

25. The apparatus of claim 22, wherein each of the plurality of frequencies comprises a very high frequency omni-directional range wave.

26. The apparatus of claim 22, wherein one of the plurality of frequencies comprises a localizer frequency.

27. The apparatus of claim 22, wherein the amplifier stage is operative to adjust the signal strength of the plurality of signals in order to bring the signal strength within a signal strength range.

28. The apparatus of claim 27, wherein the signal strength is within the signal strength range of zero to 2.5 volts.

29. The apparatus of claim 27, wherein:

the one or more processors is further operative to retrieve the signal strength range from the one or more memory devices; and the amplifier stage is further operative to adjust the signal strength of the plurality of digital waveforms in order to bring the signal strength within the signal strength range.

30. The apparatus of claim 21, wherein:

the one or more processors is further operative to adjust the amplifier stage according to the at least one automatic gain control parameter associated with the plurality of frequencies; and the amplifier stage is operative to employ the at least one automatic gain control parameter to amplify the plurality of signals in order to bring the signal strength within the signal strength range.

31. The apparatus of claim 30, wherein: the one or more processors is operative to adjust the at least one automatic gain control parameter to optimize the rate of amplification of the signal strength of each of the signals and to store the at least one automatic gain control parameter in the one or more memory devices.

32. The apparatus of claim 22 wherein the one or more processors is further operative to instruct the receiver to receive a first frequency of the plurality of frequencies for a first portion of time of a total amount of time.

33. The apparatus of claim 32 wherein the one or more processors is further operative to instruct the receiver to receive a second frequency of the plurality of frequencies for a second portion of time of a total amount of time.

* * * * *

UNITED STATES PATENT AND TRADEMARK OFFICE
CERTIFICATE OF CORRECTION

PATENT NO. : 6,437,739 B1
DATED : August 20, 2002
INVENTOR(S) : Schulte et al.

It is certified that error appears in the above-identified patent and that said Letters Patent is hereby corrected as shown below:

Column 12,
Line 59, "claim 21" should read -- claim 29 --.

Signed and Sealed this

Third Day of December, 2002

JAMES E. ROGAN
*Director of the United States Patent and Trademark Office*